United States Patent [19]

Quayle et al.

[11] Patent Number: 4,523,654

[45] Date of Patent: Jun. 18, 1985

[54] ELECTROGRAPHIC SYSTEM

[75] Inventors: Stanley F. Quayle; Philip A. Schlosser, both of Columbus, Ohio

[73] Assignee: Scriptel Corporation, Hilliard, Ohio

[21] Appl. No.: 532,191

[22] Filed: Sep. 14, 1983

[51] Int. Cl.[3] .............................................. G08C 21/00
[52] U.S. Cl. .................................................................... 178/19
[58] Field of Search ............................. 178/19, 18, 20; 324/71 R; 33/11 M; 346/139 C

[56] References Cited

U.S. PATENT DOCUMENTS

| | | | |
|---|---|---|---|
| 2,925,467 | 2/1960 | Becker | 178/18 |
| 3,591,718 | 7/1971 | Asano et al. | 178/18 |
| 3,632,874 | 1/1972 | Malavard et al. | 178/18 |
| 3,699,439 | 10/1972 | Turner | 324/71 R |
| 3,798,370 | 3/1974 | Hurst | 178/18 |
| 3,857,022 | 12/1974 | Rebane et al. | 235/151 |
| 3,885,097 | 5/1975 | Pobgee | 178/18 |
| 3,894,183 | 7/1975 | Barish | 178/18 |
| 3,911,215 | 10/1975 | Hurst et al. | 178/18 |
| 3,959,585 | 5/1976 | Mattes et al. | 178/18 |
| 4,055,726 | 10/1977 | Turner et al. | 178/18 |
| 4,071,689 | 1/1978 | Talmage et al. | 178/18 |
| 4,071,691 | 1/1978 | Pepper | 178/19 |
| 4,129,747 | 12/1978 | Pepper | 178/19 |
| 4,198,539 | 4/1980 | Pepper | 178/18 |
| 4,214,122 | 7/1980 | Kley | 178/18 |
| 4,220,815 | 9/1980 | Gibson et al. | 178/18 |
| 4,456,787 | 6/1984 | Schlosser et al. | 178/19 |

OTHER PUBLICATIONS

Trazor Touch Panel, Model 506, Sales Brochure, 1 page.
Elo Graphics Inc., E270 Transparent Position Sensor, Sales Brochure, Jan. 1981, 2 pages.
TSD Touch Screen Digitizer, Sales Brochure, Models TF-12, TF-15, 5 pages, Jul. 15, 1981.

Primary Examiner—Stafford D. Schreyer
Attorney, Agent, or Firm—Mueller and Smith

[57] ABSTRACT

An electrographic system utilizing a transparent resistive layer which operates in conjunction with a stylus or cross hair cursor excited from an a.c. source to develop coordinate defining electrical signals. Through the utilization of a sequence of border switching arrays, the signals may be collected from the resistive surface in a predetermined sequence and submitted in serial fashion to the input of a signal treatment network. As a consequence, only one such network is required to effect operation of the system. The hand-held cursor is formed including a transparent disk carrying cross hairs which is excited from an a.c. source to very accurately locate coordinate positions upon the resistive surface.

16 Claims, 9 Drawing Figures

ELECTROGRAPHIC SYSTEM

BACKGROUND

The generation of electrical signals representing graphic data has been a subject of investigation and study for many years. Applications of developments in the field of electrographics are quite numerous and promising. For example, graphic data in digital form may be treated by computer in providing graphic design problem analysis. Similarly, digitalized graphic information may be stored in computer memory or transmitted between remote stations via telecommunication links.

The generation of electrographic signals is initiated at a man-machine interface which generally is present as a surface upon which graphic data is manually developed. For the most part, such development occurs in the same fashion as graphics are generated utilizing paper, a stylus representing a writing instrument being drawn across the surface to form informational characters or designs. The surfaces upon which this drawing takes place are commonly known as "digitizers". The digitizers respond to the coordinate position of the stylus held by the operator and generate analog coordinate signals which are appropriately treated and converted to digital form for transmission.

For the most part, digitizers have been fashioned as composite structures wherein a grid formed of two spaced arrays of mutually orthogonally disposed fine wires is embedded in an insulative carrier. One surface of this structure serves to receive a stylus input which is converted to coordinate signals. Various methods have been devised for generating coordinate defining signals as a stylus-grid interaction, for example, a magnetostrictive effect may be established between stylus and grid or a capacitive coupling effect may be evoked between these components.

The use of such grid structures, while providing accurate, linear output coordinate signals necessarily involve intricate structures which are expensive to fabricate and prone to damage in the normal course of use. Further, for many applications it is desirable that the digitizer be fabricated as a highly transparent composite sheet. The grid structures within the composite structures, however, militate against achieving such desired transparency.

Another principal approach to the design of digitizers looks to the use of resistive surface coatings. An immediately apparent advantage of this approach resides in the inherent simplicity of merely providing a resistive surface upon a supportive substrate such as glass or plastic. Further, the resistive coating may be transparent to permit an expanded range of industrial applications.

Unfortunately, designers have encountered a variety of technical problems in adopting the resistive layer to provide cordinate output signals. Among these problems has been the non-linear nature of these coordinate read-outs. A precise one-to-one correspondence is required between actual stylus position and the resultant coordinate signals. However, a pin cushion form of distortion, among others, has been encountered by investigators causing the achievement of linearity of output to become an elusive goal. Various forms of correction have been developed; however, each such correction has been at the expense of losing a desired operational attribute or feature of the digitizer. Among these features desired for the digitizer product is a capability of "writing" with the stylus not touching the surface of the digitizer. Additionally, as indicated above, it is desirable that the digitizer be fabricable as a highly transparent surface. Further, it is most desirable that the digitizer work in conjunction with a sheet of opaque paper such that the operator may draw or make positional visual inputs upon the sheet of paper while, simultaneously, the digitizer provides real time coordinate output signals. Next, the structure of the digitizer must remain simple and immune from the wear and related vagaries encountered in common drafting utilization. In the latter regard, where composite structures requiring separation of resistive surfaces followed by flexure of one into the other are evolved, not only the cost of the digitizer becomes elevated but also the operational life and general reliability thereof become compromised.

Another desirable design aspect for digitizers resides in the development of signal conditioning circuitry accommodating typically encountered common mode noise. Where resistive surfaces are employed, various forms of ambient noise or spurious signals will be developed which will be manifested as error unless corrected. Of course, such accommodation necessarily is at the expense of more elaborate and costly circuit design. In the same regard, a minimization of the number of circuit components required to achieve accurate coordinate identification permits enhanced marketing opportunities for the digitizer products.

In addition to carrying out "writing" functions through the use of an operator held stylus or the like in conjunction with a digitizer surface, it very often is desirable for the operator to identify precise coordinate points upon a plan or drawing used in conjunction with a transparent digitizer surface. The stylus conventionally utilized with the digitizers may be somewhat inaccurate for this purpose inasmuch as the point thereof will have a finite thickness which tends to block the operator's vision from achieving a proper centering of the stylus over the desired point upon which coordinates are to be established. Accordingly, a desirable feature for such digitizers is some form of cursor which does not block the operator's view in establishing the coordinate position of a given point. In a copending application for U.S. patent Ser. No. 395,261 filed July 6, 1982, now U.S. Pat. No. 4,456,787 by the inventors hereof entitled "Electrographic System and Method", a digitizer structure is described which advantageously utilizes a transparent digitizer surface in conjunction with a stylus which is excited from an a.c. source to provide a field interaction with the digitizer surface. Through the utilization of coordinate identified edge contact switching in conjunction with the stylus and through the utilization of sum and difference output signal ratio treatment, the digitizer described therein is capable of achieving desirable linear output and of operating satisfactorily with stylus positioning at locations spaced from the digitizer surface itself. Further, the particular ratio form of signal treatment described therein serves to alleviate difficulties otherwise associated with common noise perturbations typically generated in the operation of such system. While representing an effective approach to the development of a practical digitizer structure, the signal treatment approach shown therein is one involving a considerable number of circuit elements a significant portion of which require accommodation for drift, offset phenomena and the like.

SUMMARY

The present invention is addressed to an electrographic system for generating coordinate signals wherein coordinate positions upon a transparent resistive surface are identified through the use of signals generated by an a.c. excited stylus or cursor, such signals being collected from the border regions of the resistive surface in a controlled, unique switching sequence. Utilizing very low impedance solid state switches in conjunction with this controlled sequence, only a single chain of analog signal treatment components is required to provide full four quadrant signal treatment capability. As a consequence, the design and control difficulties otherwise associated with drift, offset phenomena, and the like are significantly minimized. Additionally, the lessening of the number of components otherwise required to achieve accurate readout is substantially reduced. The invention further features a cross hair cursor which is uniquely associated with the system and which permits the operator to very accurately locate the coordinate position of selected points upon a digitizer surface.

Another feature and object of the invention is to provide an electrographic system having a resistive layer formed over an electrically insulative substrate which has an operational region extending in an x-coordinate sense between first and second parallel, spaced-apart border regions and in a y-coordinate sense between third and fourth parallel, spaced-apart border regions. A stylus is provided for generating localized electromagnetic radiation from an a.c. source to effect the propagation thereof toward the resistive layer from positions selectively spaced therefrom to effect an interaction. A plurality of first, discrete, spaced-apart contacts are electrically coupled with the resistive layer at the first border region, while a plurality of second, discrete, spaced-apart contacts are electrically coupled with the resistive layer at the second border region. A plurality of third, discrete, spaced-apart contacts are electrically coupled with the resistive layer at a third border region, and a plurality of fourth, discrete, spaced-apart contacts are electrically coupled with the resistive layer at a fourth border region. Signal treating means are provided having an input of predetermined impedance for selectively receiving electrical signals generated by the stylus interaction and which are present at the first and second contacts to derive x-coordinate signals corresponding with the x-coordinate location of an interaction. The signal treating means further is selectively responsive to electrical signals present at third and fourth contacts to derive y-coordinate signals corresponding with the y-coordinate location of an interaction. First, discrete, low impedance solid-state series switches are provided, each being contacted between a selected one of the first contacts and the signal treating input, such switches being actuable to effect conveyance of the electrical signals to such input. Second discrete, low impedance solid-state series switches are coupled between a selected one of the second contacts and the signal treating input and are actuable to effect conveyance of electrical signals to the input. Similarly, third discrete, low impedance solid-state series switches are coupled between a selected one of the third contacts and the signal treating input, such switches being actuable to effect conveyance of electrical signals to the input, while fourth discrete, low impedance solid-state series switches are coupled between each of the fourth contacts and the signal treating input and are actuable to effect conveyance of such signals to that input. First discrete, low impedance solid-state grounding switches are coupled between a select one of the first contacts and ground and are actuable to effect coupling of that select contact with ground, while second, discrete, low impedance solid-state grounding switches are coupled between a select one of the second contacts and ground and are actuable to effect coupling of that contact with ground. Third discrete, low impedance solid-state grounding switches are coupled between a select one of the third contacts and ground and are actuable to effect coupling of the contact to ground, and fourth discrete, low impedance solid-state grounding switches are coupled between a select one of the fourth contacts and ground and are actuable to effect coupling of the select fourth contact with ground. A control circuit is provided having an output which is coupled with the first, second, third and fourth series switches as well as the first, second, third and fourth grounding switches to effect the actuation of the first series switches simultaneously with the actuation of the second grounding switches during a first data mode of operation. The control actuates the second series switches while simultaneously actuating the first grounding switches during the second data mode and actuates the third series switches while simultaneously actuating the fourth grounding switches during a third data mode. Finally, the control circuit actuates the fourth series switches while simultaneously actuating the third grounding switches during a fourth data mode, the coordinate data thus developed being introduced in series fashion to the signal treating components in a predetermined repetitive sequence of data modes. To achieve desired linear operation of the system, the switches exhibited impedance, when actuated, of less than about 5 ohms.

As another feature and object of the invention, the signal treating components of the system include a voltage converter having an input for receiving electrical coordinate signals from the switching elements as well as a converter for converting the alternating voltage output of the voltage converter to a constant voltage output. The signal treating components then provide for converting that constant voltage output to digitally characterized signals. These digitally characterized signals then are treated by a processor component of the control circuit having an input for receiving such signals during each data mode and which responds to treat these digitally characterized signals to generate digital x-coordinate signals corresponding with the ratio of the difference of the digital characterized signals receiving during the first and second data modes divided by the sum thereof. The coordinate signals then are provided at an output of the processor.

As a further object and feature of the invention, an electrographic system is provided wherein a resistive layer is positioned over an electrically insulated substrate and provides an operational region extending in an x-coordinate sense between first and second parallel, spaced-apart border regions and which extends in a y-coordinate sense between third and fourth parallel, spaced-apart border regions. A cursor is provided which includes an electrically conductive transparent disk having a cross hair indicia formed thereon which is positionable adjacent the resistive layer. The cursor is excited from an a.c. source to generate localized electromagnetic radiation from the disk to effect interaction with the resistive layer to evolve coordinate identification of the location of the cross hairs. A plurality of first discrete, spaced-apart contacts are electrically coupled with the resistive layer at the first border region, while a plurality of second, discrete, spaced-apart contacts are electrically coupled with the resistive layer at the second border region. A plurality of third, discrete, spaced-apart contacts are electrically coupled with the resistive layer at the third border region, while a plurality of fourth, discrete, spaced-apart contacts are electrically coupled with the resistive layer at the fourth border region. A signal treating circuit is provided having input for selectively receiving electrical signals generated by the cursor interaction and which are present at the first and second contacts to derive output signals corresponding therewith and further selectively receives the electrical signals present at the third and fourth contacts to derive output signals corresponding therewith. Solid-state switching arrays are provided for coupling the first contacts in signal transferring relationship with the signal treating circuit input while effecting a mutual open circuit isolation of the third and fourth contacts. The switching arrangement further provides for coupling of the second contacts in signal transferring relationship with the signal treating circuit input while effecting a mutual, open circuit isolation of the third and fourth contacts. The switching arrangement further couples the third contacts in signal transferring relationship with the signal treating circuit input while effecting a mutual, open circuit isolation of the first and second contacts and which couples the fourth contacts in signal transferring relationship with the signal treating circuit input while effecting a mutual, open circuit isolation of the first and second contacts. A control circuit is provided which is responsive to the output signals for deriving x-coordinate signals corresponding with the x-coordinate location of an interaction of the cursor with the resistive layer and y-coordinate signals corresponding with the y-coordinate location of such interaction.

Other objects of the invention will, in part, be obvious and will, in part, appear hereinafter.

The invention, accordingly, comprises the apparatus and system possessing the construction, combination of elements, arrangement of parts which are exemplified in the following detailed disclosure.

For a fuller understanding of the nature and objects of the invention, reference should be had to the following detailed description taken in connection with the accompanying drawings.

DETAILED DESCRIPTION

Figure 1:
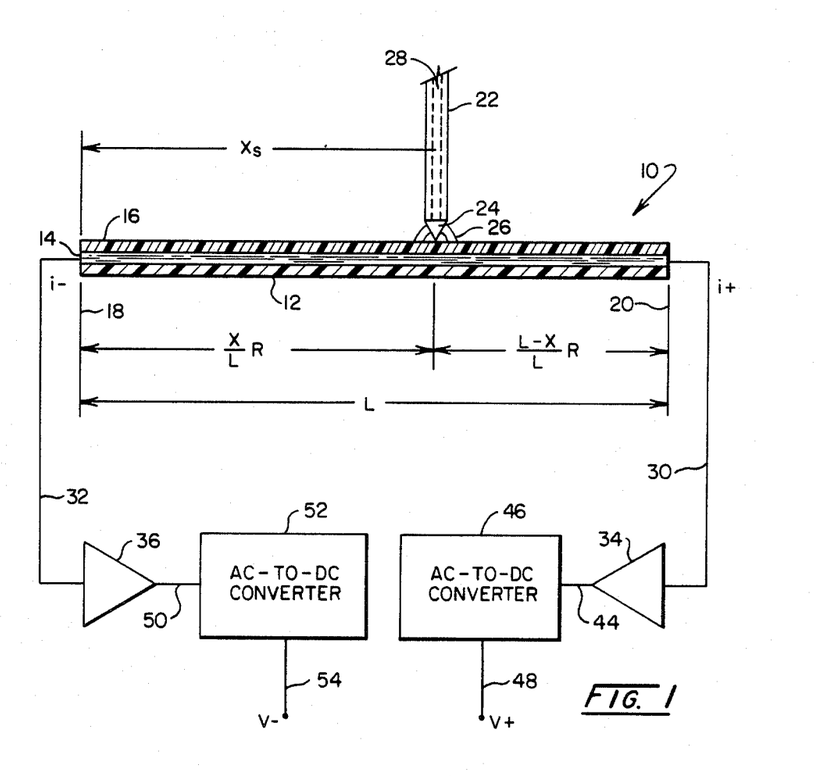
FIG. 1 is a schematic representation of a one-dimensional model of the electrographic system of the invention.

An advantageous simplicity of the electrographic system of the invention is achieved, inter alia, in consequence of an inherent linearity stemming from its design. As a prelude to considering the overall structure of the apparatus forming the system of the invention, reference initially is made to a one-dimensional model thereof as represented in FIG. 1. Referring to that figure, the one-dimensional model is shown to comprise a sectional view of a digitizer 10 formed of an electrically insulative substrate 12 over which is positioned a resistive layer 14. The upwardly disposed surface of resistive layer 14 is protected by an electrically insulative layer 16. In a preferred embodiment, substrate 12 and layer 14 are transparent and may be present as a rigid support formed of glass or the like or, alternately, may be provided as a flexible transparent plastic such as Mylar. Resistive layer 14 has a highly uniform sheet resistance selected in a value range of about 100 to 10,000 ohms per square. For improved versatility of application, the layer 14 preferably is transparent and, thus, may be formed of an indium tin oxide or other suitable semi-conducting metal oxide incorporating metals from the group tantalum, indium, tin, antimony, or mixtures thereof. For the one-dimensional aspect shown, layer 14 has a length, L, extending from boundary line 18 to boundary line 20. Located above the protective insulative layer 16 is a stylus 22 which may be provided having a point region 24 formed of metal and which may serve a conventional writing function and for this purpose be present as a ballpoint pen. Stylus 22, in effect, serves as a transmitter of low power electro-magnetic radiation which is represented by field lines 26. Generally, the stylus 22 emits an A.C. signal selected in the range of about 100 KHz to 1 MHz and incorporates a shielded rod shown in phantom at 28 which is excited with an A.C. current and extends to the unshielded point portion 24. Excitation of the stylus 22 may be provided through connection with an A.C. voltage source or, alternately, the stylus may be entirely self-contained having a battery power supply along with a simple oscillator circuit. The range of frequency noted above is selected principally with respect to the most practical amplifiers utilized ultimately to treat the resultant signals of the system. As is apparent, direct contact between the point 24 of stylus 22 and resistive layer 14 is not required for the system to perform, in fact, the system works well through paper or essentially any insulative medium which will not block the radiated field signal. The radiative output 26 of stylus 22 is in the microwatt range and couples with or electrically interacts with resistive layer 14 to provide mirror charges, the electric field thereof forming free charges within layer 14. To provide this, ground levels are developed at oppositely disposed connections with layer 14 at respective borders 20 and 18. In order to achieve desired edge grounding at couplings 30 and 32, operational amplifiers shown respectively at 34 and 36 may be employed, the initial input stages thereof representing a virtual earth input such that the connections 30 and 32 will remain very near to ground level or at least within microvolts thereof. In the description of the preferred embodiment of the system presented later herein, it will be seen that the sampled coordinate side or border does develop a potential which is treated for coordinate identification, while the opposite coordinate side or border is held at ground. However, for the instant, one dimensional, demonstration, both borders along a given coordinate are simultaneously sampled and are each assigned a ground level potential.

Figure 2:
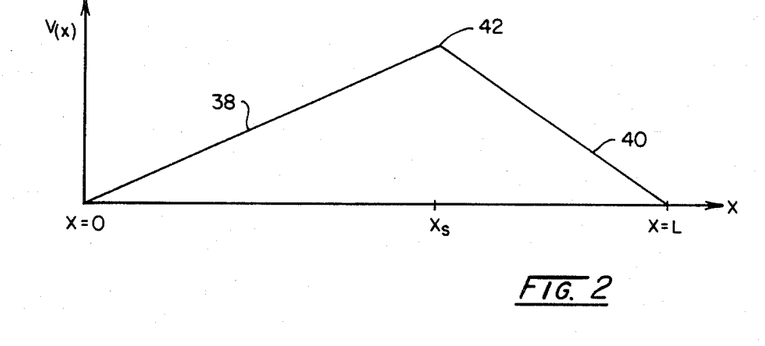
FIG. 2 is a schematic curve showing voltage distribution across the resistive sheet represented in FIG. 1.

Inasmuch as a largest voltage at layer 14 is derived at the charge coupling of field 26 and the ends of resistive layer 14 at connections 30 and 32 for the instant one-dimensional model are at ground as a boundary condition, a current must flow and this current is utilized to develop a one-dimensional or "x" position of stylus 22 as a distance from border 18. In view of Ohms Law, the voltage distribution from stylus 22 along the x dimension is linear and this linearity is schematically represented in FIG. 2 at voltage profiles 38 and 40. Looking additionally to that figure, the profiles 38 and 40 are shown to lead to an apex 42 aligned with the center line of stylus 22. Apex 42 represents the position of highest voltage at layer 14 and the linear distribution of voltages extending from apex 42 as represented by profile 38 leads to the position x=0 or zero voltage and along profile 40 to the value x=L, again representing a zero voltage boundary limit at distance L from boundary 18.

Returning to FIG. 1, it may be observed that the fraction of resistance exhibited to the charge splitting activity at field 26 extending from boundary 18 to stylus 22 may be expressed as:

$$\text{resisitance} = \frac{x}{L} R \qquad (1)$$

where R is sheet resistance of layer 14. The corresponding fraction of resistance extending from stylus 22 to boundary 20 may be represented by the expression:

$$\text{resistance} = \frac{L-x}{L} R. \qquad (2)$$

The current occasioned by charge splitting at the localized charge coupling point of stylus 22 migrates toward ground level couplings 30 and 32 to provide A.C. currents labeled respectively i+ and i−.

Utilizing expressions (1) and (2) above, and assuming a stylus voltage as $V_s$, the value of currents i+ and i− may be expressed as follows:

$$i+ = \frac{V_s}{\left(\frac{L-x}{L}\right) R} \qquad (3)$$

$$i- = \frac{V_s}{\left(\frac{x}{L} R\right)} \qquad (4)$$

Coupling 30 is connected with the input of operational amplifier 34 which serves as a current to voltage converter. When the input impedance of operational amplifier 34 is negligible with respect to the sheet resistance, an important aspect of the instant invention, the edge at 30 is essentially at ground potential. Correspondingly, coupling 32 is connected to the input of operational amplifier 36 which serves to convert the current designated i− to an A.C. voltage. The output of amplifier 34 at line 44 is introduced to an A.C. to D.C. converter 46 which serves to convert the A.C. signal to a D.C. level at line 48 which is labeled V+.

In similar fashion, the output of amplifier 36 is present at line 50 which, in turn, is coupled to an A.C. to D.C. converter 52 having an output at line 54. As before, the D.C. voltage is labeled, V−.

The signals thus developed at lines 48 and 54 may be treated in a manner wherein the effect of common mode noise is substantially minimized and wherein the variations in signal output otherwise occasioned by positioning of the stylus 22 at various elevations above the resistive surface 14 may be avoided. In particular, a difference/sum ratio may be developed which provides these desirable aspects. In this regard, the ratio of the difference of the signals at lines 48 and 54 with respect to the sum thereof may be expressed as a voltage, $V_{out}$, which may be expressed as follows:

$$V_{out} = (V+ - V-)/(V+ + V-). \qquad (5)$$

Utilizing the earlier discussed current equations (3) and (4) based upon the sheet resistance R and the voltage of the stylus, $V_s$, and applying those current equations to the difference/sum ratio, and utilizing straightforward algebraic relationships, the value of the ratio becomes:

$$V_{out} = 2x/L - 1. \qquad (6)$$

Thus, the difference/sum voltage ratio is normalized in character and through the utilization of a signal as derived as $V_{out}$, the instant system becomes entirely independent of the voltage, $V_s$, generated through coupling by stylus 22; becomes independent of the sheet resistance, R, evolved at layer 14; and minimizes the effects of common mode noise. As stylus 22 is moved away from the surface layer 14, the system functions to derive the position of the centroid of the propagated electromagnetic flux. This aspect will be seen to be of considerable value where cursor devices are contemplated for use with the system. Thus, with the provision of symmetrically transmitted stylus position signals, the independence of stylus 22 spacing is assured within reasonable limits. These normalized signals, being independent of the coupling voltage generated by stylus 22, not only permit the utilization of the stylus in conjunction with layer 14 at varying distances therefrom, but also through documents of an insulative nature such as books, memo pads, sales booklets and the like. In actual practice, the stylus has been utilized through a one-inch wood board.

Also to be recognized from the arrangement thus described, an independence to sheet resitance of the system permits manufacture with more relaxed tolerances. Further, for the one-dimensional arrangement shown, the output voltage generated by stylus 22, for example, as it moves from the one border 18 to the other at 20 is totally linear. For example, for the equation (6) shown above, when the distance x is 0, $V_{out}$ is equal to −1 volts; when distance x is 0.5 L, $V_{out}$ is 0 volts; and when x is equal to the distance L, $V_{out}$ becomes +1 volt.

It may be recalled that the foregoing discussion is concerned with a one-dimensional model. The advantageous normalized output signals independent of stylus 22 voltage as well as sheet resistance, R, may be effectively incorporated within a two-dimensional, x,y electrographic system.

Figure 3:
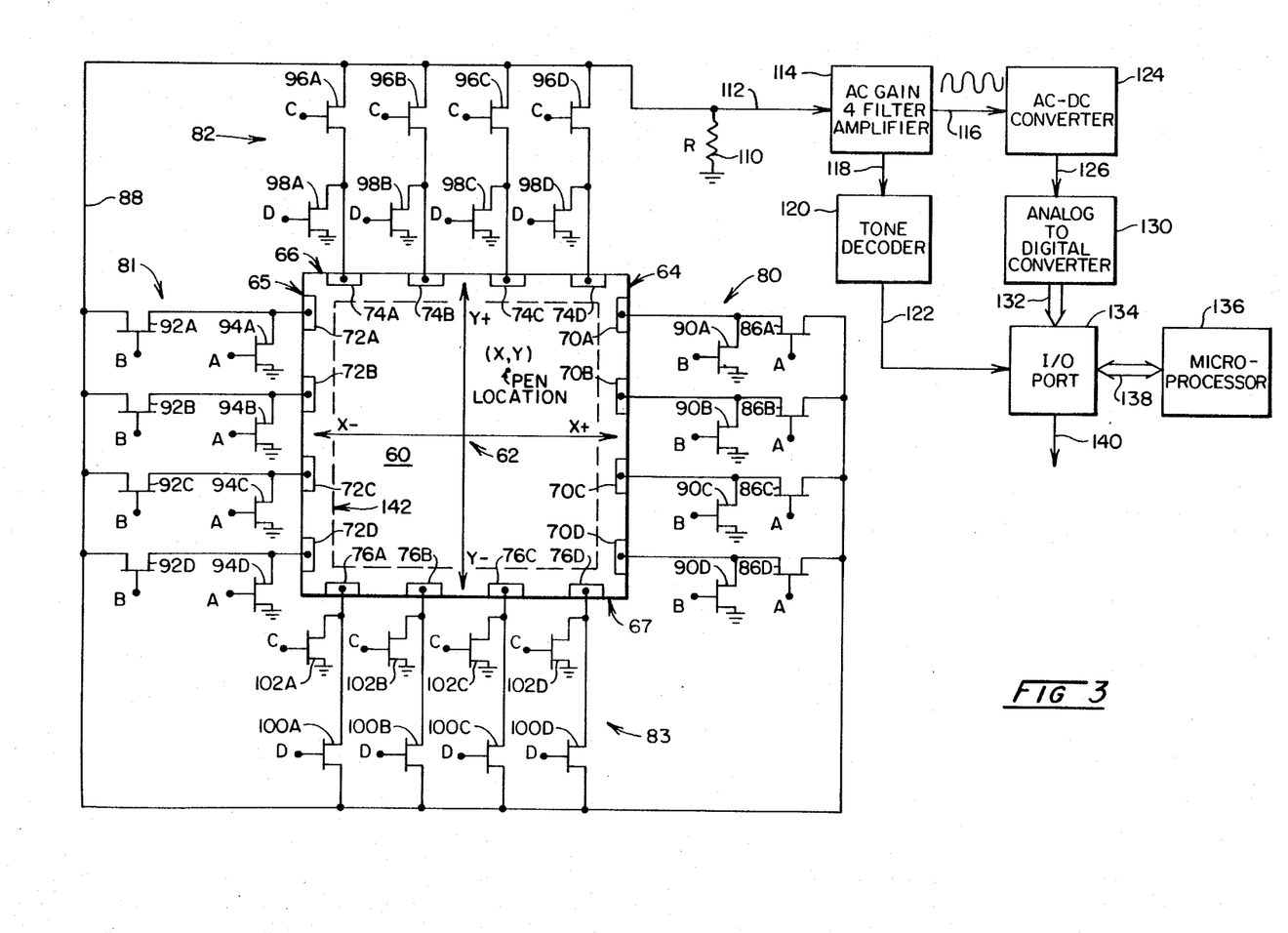
FIG. 3 is a schematic plan view of a digitizer configured according to the invention.

Referring to FIG. 3, the development of a digitizer incorporating the operational aspects of the one-dimensional embodiment in a two-dimensional theme is schematically portrayed. The digitizer resistive surface is represented by the square surface represented generally at 60. Surface 60 may have a cross section identical to that described at 10 in conjunction with the one-dimensional model. Further, the surface 60 may be considered to operate in conjunction with designated x and y coordinate pairs as represented generally by the labelled axes at 62. In this regard, it may be observed that the x+ coordinate extends to an edge or border region of the surface 60 as represented generally at 64. The oppositely disposed, x− coordinate extends to an edge or border region represented generally at 65. In similar fashion, the y+ component of coordinate pair 62 extends to a border region represented generally at 66, while the opposite or y− coordinate extends to corresponding border region 67.

In a practical implementation of the digitizer, the surface 60 may be "framed" by a printed circuit structure which communicates with the border regions 64–67 through spaced pad structures. Note in this regard, that border region 64 is electrically contacted by contact pads 70a–70d, while the oppositely disposed border region 65 is connected to corresponding contact pads 72a–72d. In similar fashion, the border region 66 of the x,y coordinate direction is shown in electrical communication with contact pads 74a–74d, while the oppositely disposed, y− coordinate border region 67 is associated in electrical communication with contact pads 76a–76d. The contact pads within the border regions may be formed as part of a framing printed circuit board structure and are spaced apart a distance generally corresponding with their elongate dimension. As an example of such spacing, a 14-inch square sheet region 60 has been formed utilizing four such pads as shown having an elongate dimension of about 1½ inches and a corresponding spacing therebetween.

As indicated earlier herein, to operate effectively, the digitizer system provides for the collection of coordinate data through the use of an a.c. stylus applied signal by permitting one set of coordinate regions, for example, the y coordinate region, to "float" in electrical isolation, while the oppositely-disposed or x coordinate border regions 64 and 65 are maintained essentially at ground level and the currents generated therein are collected for treatment. The opposite arrangement obtains for collecting y coordinate data from regions 66 and 67. In accordance with the instant invention, these developed electrical signals are collected in a predetermined sequence from each of the borders 64–67 as the system cycles through sequential signal collection or data modes. The collection of such signals with the instant system requires a switched activation of the contacts or pads in predetermined sequence and it is essential to linear operation that the "on" resistance of those switches which are utilized be negligible. In this regard, it is desirable that the actuated or "on" resistance exhibited by such switching be less than about 5 ohms.

The switching function carried out with respect to resistive surface 60 is provided by a switching network 80 associated with border region 64, a switching network 81 associated with border region 65, a switching network 82 associated with border region 66 and a switching network 83 associated with border region 67. These networks 80–83 may be mounted upon a printed circuit board surrounding the resistive region 60 in the manner of a thin frame. Each of the networks 80–83 are identically structured. In this regard, network 80 is seen to incorporate series switches 86a–86d which are provided as field effect transistors for example of type SD1117N marketed by Semi Processes, Inc. of San Jose, Calif. It may be observed that the source and drain electrodes of each of the FET switches 86a–86d serve to connect respective pads 70a–70d with a common signal conveying line 88. Additionally, the gate electrodes of each of the FET switches 86a–86d are arranged to receive a gating or actuating input causing them to assume an "on" status by virtue of a signal applied thereto and identified as "A".

Network 80 further includes a second series of field effect transistor (FET) grounding switches 90a–90d. Switches 90a–90d additionally may be provided as type SD1117N (supra) and are connected such that their drain and source electrodes couple respective pads 70a–70d to ground upon being actuated to an "on" condition by virtue of the imposition of a gating signal labelled "B" thereto.

Looking to the oppositely disposed switching network 81, it may be observed that each of the contact pads 72a–72d is connected with common line 88 through the source and drain electrodes of FET switches 92a–92d. These series switches may be of the type SD1117N (supra) and are actuated or gated into an "on" status by application of a gating signal represented as "B" to the gate electrodes thereof. Note that this gating signal is the same as that applied to the grounding switches 90a–90d. Additionally, the pads 72a–72d may be coupled to ground by virtue of the connection through the source and drain electrodes of respective FET switches 94a–94d to ground. Switches 94a–94d may be of the type SD1117N (supra) and are seen to be gated by the earlier described gating signal labelled "A" as applied to their gate electrodes.

Looking to the y coordinate networks 82 and 83, it may be observed that contact pads 74a–74d are coupled through the source and drain electrodes of respective series FET switches 96a–96d to common line 88. As before, the switches 96a–96d may be of type SD1117N (supra) and are gated or actuated into a "on" condition by virtue of a gating signal labeled "C" applied to their gate electrodes. Contact pads 74a–74d additionally may be coupled to ground through the source and drain electrodes of respective FET grounding switches 98a–98d. These switches, as before, may be of type SD1117N (supra) and are gated or actuated into a "on" status by virtue of the imposition of an appropriate gating signal labelled "D" to the gate electrodes thereof.

Lastly, it may be observed that the contact pads 76a–76d associated with network 83 are coupled through the source and drain electrodes of respective FET series switches 100a–100d to common signal collection line 88. FET switches 100a–100d may be of the above-described type SD1117N and are gated or actuated into an "on" status by virtue of the imposition of a gating signal labelled "D" to the gate electrodes thereof. Similarly, contact pads 76a–76d may be coupled to ground through the source and drain electrodes of respective FET grounding switches 102a–102d in consequence of the application of an appropriate gating or actuating signal, herein labelled "C" to the gating electrodes thereof.

It may be recalled, to provide for effective, linear performance of the digitizer, the pads or contacts in one coordinate sense, for example, y+,y− at border regions 66 and 67 must be maintained in an isolated state, while the oppositely disposed border regions for the x+,X− coordinates as at regions 64 and 65 are retained essentially at ground potential and the electrical signals migrating thereto are collected. Alternately, the latter border regions 64 and 65 are maintained in an electrically isolated state, while sampling is carried out at regions 66 and 67, the respective contacts or pads 74a-74d and 76a-74d being maintained near to ground potential for signal collection. In general, the collected signals are submitted to a current to voltage converter, the input stage of which is retained essentially at near ground potential and the voltage signal output thereof is rectified and the signals ultimately are submitted for sum/difference ratio determinations and interpretation.

In accordance with the instant invention, the signal treating components required for the above purpose are significantly reduced by a factor of four through the unique arrangement of switching networks 80-83 operating under the selectively gating data mode control inputs of a control preferably operated from a programmed microprocessor. Looking additionally to FIG. 4A, the earlier-described gating signals A-D are revealed in conjunction with respective timing diagrams or curves 104-107. Each of the gating signals, representing an "on" level input to the gate electrode of an oppropriate FET switch is seen to occur during a data mode or interval indicated in the sequence T1-T4. Thus, gating signal A occurs for an interval T1 and then is followed in sequence by gating signal B occurring for an interval T2, following which gating signal C occurs for a data interval T3 and gating signal D occurs for the ensuing interval T4. These intervals continue in this rotational sequence or any desired such sequence during the operation of the digitizer system.

Figure 4A:
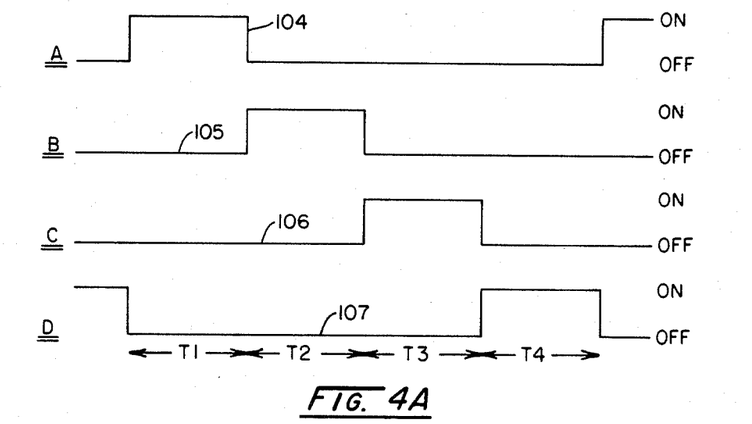
FIGS. 4A and 4B are schematic representations of timing and control sequence curves for sequential data modes or intervals of operation of the control system of the invention.

Observing the effect of such gating, note that, in network 80 during the occurrence of gate signal A and interval or data mode T1, FET series switches 86a-86d are in an "on" condition to provide for the collection or conveyance of electrical signals from resistive surface 60 into line 88 from border region 64. During this same data mode or interval T1, FET grounding switches 94a-94d are in an "on" condition and, thus, border region 65 is maintained at a ground potential. However, the signals as may migrate to border region 65 are not collected but are diverted to ground through the grounding switches 94a-94d. The sampled or collected signals conveyed to collection line 88 are directed to a termination resistor 110 which is coupled to ground. This causes the development of an a.c. potential. The latter potential is witnessed at line 112. Typically, the current signal conveyed through collection line 88 will exhibit a frequency, for example, of about 200 kHz, and a current value of about 10 millivolts. Line 112 is directed to an a.c. gain and filter amplification stage represented at block 114. Stage 114 provides an amplified voltage signal at its output as represented at line 116. For the earlier-described typical signal, such output may, for example, be of about 10 volts a.c. Additionally, stage 114 may provide an output as represented at line 118 to a tone decoder represented at block 120 which serves to provide a control signal representing the presence or active use of a stylus or the like. The signal output of tone decoder stage 120 is shown being directed through line 122.

Figure 4B:
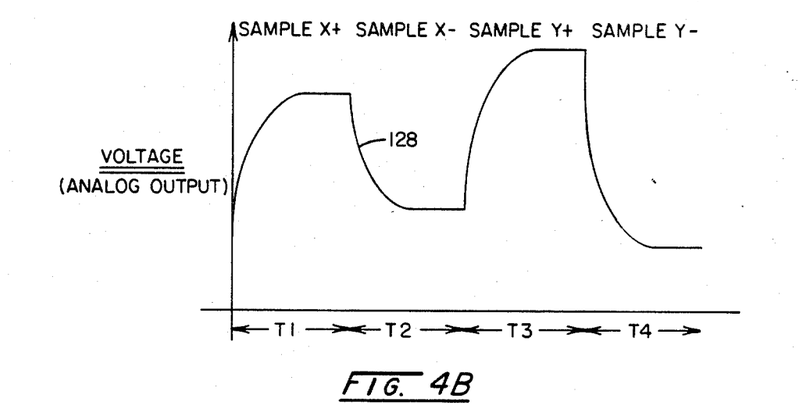

The voltage signal at line 116 is shown directed to the input of an a.c. to d.c. converter stage represented at block 124. Stage 124 provides a precision rectification of the incoming a.c. signal so as to develop a first order d.c. response or analog output at its output represented at line 126. The signal at line 126 will, for example, range from 0 to 10 volts d.c. Looking momentarily to FIG. 4B, it may be observed that a typical output as represented at line 126 is shown by curve 128 and associated data modes or intervals T1-T4, FIG. 5B being shown in alignment with the gating signals represented in FIG. 4A. Note that a portion of each data mode interval is required for the curve 128 to "level out" or stabilize.

Returning to FIG. 3, the output at line 126 carrying the voltage level corresponding to a coordinate signal is converted to digital form by an analog-to-digital converter as represented at block 130. The parallel digital signal output from block 130 is represented by bus 132 which is directed to the input/output function of a microprocessor circuit as represented by block 134. Input-/output function 134 operates in conjunction with a microprocessor function represented at block 136 which may, for example, be of a type 8085 microprocessor marketed by Intel Corporation of Santa Clara, Calif. Microprocessor 136 additionally receives an input from line 122 indicating the presence of the stylus and serves to both carry out sum and difference ratio computation as well as to provide the timing and control sequence gating signals discussed in conjunction with FIG. 4A.

Returning to FIG. 3, following the receipt and treatment of the signals as collected through switches 86a-86d at network 80, gating pulse B occurs as represented by curve 105 in FIG. 4A. With the presence of gating signal B and the removal of gating signal A, the series switches 92a-92d of network 81 are actuated to an "on" condition, while the corresponding series switches 86a-86d of network 80 are turned off. Additionally, however, grounding switches 90a-90d of network 80 are gated to a "on" condition and thus, the pads 70a-70d of border region 64 are coupled to ground, while the corresponding pads 72a-72d of border region 65 are coupled through low impedance switches 92a-92d to collection line 88, whereupon the signals are treated as above described.

The control system then sequences as represented at curve 106 in FIG. 4A to generate gating signal C during data mode or interval T3. During this interval, all switches within networks 80 and 81 are in an "off" condition and the border regions 64 and 65 are electrically isolated and electrically "float".

With the application of gating signal C, series FET switches 96a-96d of network 82 as well as grounding FET switches 102a-102d of network 83 are turned on. As a consequence, coordinate related signals migrating to border region 64 are conveyed to collecting line 88, while those migrating to border region 67 are diverted to ground. The signals so collected at line 88 then are processed to digital format and directed to microprocessor function 136. During the next succeeding data mode or interval T4, gating signal D is developed as represented at curve 107 in FIG. 4A. During this interval, series FET switches 100a-100d of network 83 are turned on to provide for the conveyance of electrical coordinate current signals to collection line 88, while the corresponding grounding switches 98a-98d of network 82 serve to divert the oppositely migrating signals to ground. The signals so collected from network 83 then are conveyed to treatment and presentation to microprocessor 136 as described above. Following the data mode or interval T4, the system sequences to data mode T1 and follows a continuous cycling.

From the foregoing it may be observed that each of the border regions 64–67 is sequentially sampled for coordinate data and the resultant signals are correspondingly treated and directed to microprocessor function 136. As a consequence, only one sequence of signal treating components as represented at components 110, 114, 124 and 130 are required by the system. This results in an advantageously significant reduction in the number of components required for the digitizer system and, of particular importance, minimizes the requirements for accommodating drift and like vagaries associated with such treatment stages. Preferably, the sequentially developed coordinate signals, now in digital form, are retained in temporary memory, for example a scratchpad RAM, and then are accessed for sum/-difference ratio treatment by the computational function of the microprocessor feature 136. In this regard, assuming the digital signals developed from border regions 64 are symbolized as X+, the digital signals developed at border region 65 are assigned a X+ symbolism, the digital signals deriving from border region 66 are assigned a Y+ designation and the corresponding digital signal representing the collection of data at border region 67 are assigned a Y− designation, then the arithmetic operation carried out by the microprocessor function 136 to evolve an x,y coordinate position may be represented as follows:

$$x = (X+ - X-)/(X+ + X-) \tag{7}$$

$$y = (Y+ - Y-)/(Y+ + Y-). \tag{8}$$

Microprocessor function 136 is shown associated with the general input/output function through a multi-lead connection 138. Function 134, as well as receiving data for utilization by the microprocessor 136 outputs treated data representing coordinate signals and the like as represented at line 140. Such outputting may be in the form of a multi-lead bus or, where serial data output is contemplated, through a single lead.

Looking to resistive region 60, it may be observed that a dashed boundary 142 extends about all of the border regions 64–67. To assure appropriate linearity, it has been determined that the stylus should not be utilized within about one inch of the array of contact pads. Accordingly, the microprocessor determines whether any of the computed x,y coordinates are such as would fall without the boundary 142. If that is the case, then the coordinate data so developed would not be displayed or made available at line 140.

Figure 5A:
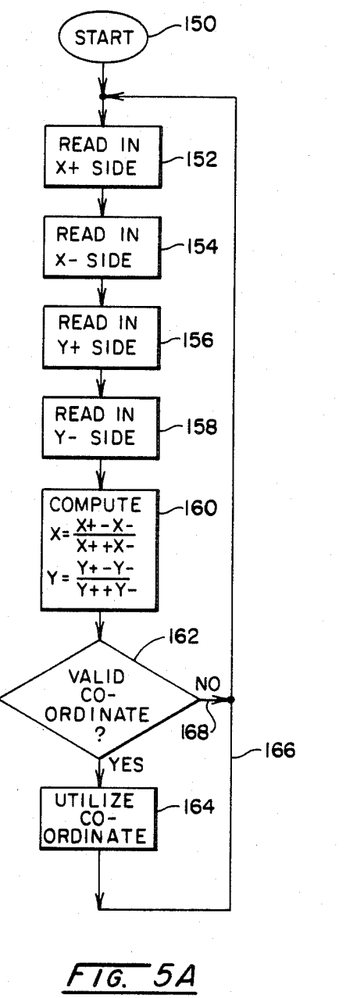
FIGS. 5A and 5B are program flow charts for the processor function of the control circuit of the invention.
Figure 5B:
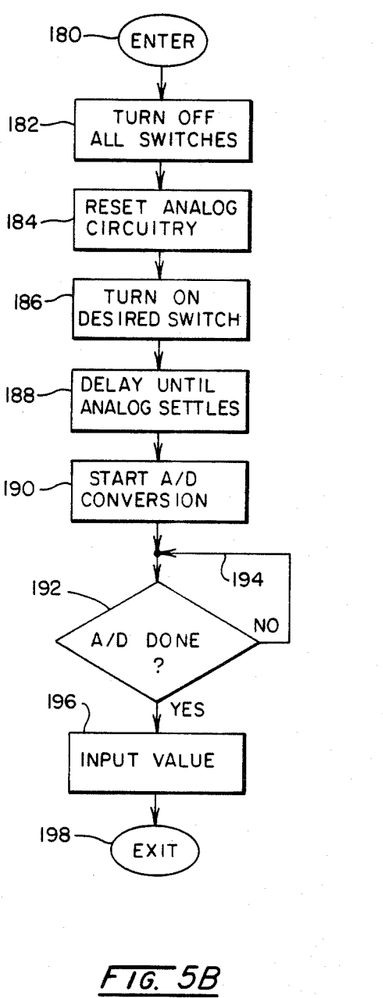

A typical control program under which the microprocessor function represented at block 136 may be operated is represented by the flow diagram set forth in FIGS. 5A and 5B.

Looking to FIG. 5A, an overall representation of the program is portrayed as commencing with a start terminal 150 which serves to provide the conventional initialization commands. Following the commencement of this initialization procedure, as represented at block 152, the program causes appropriate switching to read in the x+ side of resistive surface 60 as described in conjunction with border region 64. Upon receipt of such information as reduced to digital form through converter 130, the information is stored in temporary or scratchpad random access memory (RAM) and the program proceeds to the next instruction as represented at block 154. At block 154, the opposite or x− coordinates are read as are developed at border region 65 in conjunction with the carrying out of appropriate switching. The digital data then are stored, as before, in temporary RAM. Following the reading of the x coordinates, as represented at block 156, the program commences to read the y+ coordinate side as developed in conjunction with border region 66. Upon the collection of such data, a storage thereof is effected in temporary memory. The program then proceeds to read the remaining required data as represented at block 158 wherein the y− coordinate data are read and retained as are developed at the border region 67. While the particular sequence of the above readings may be varied to suit the desires of the operator, following the collection thereof, the sum and difference ratios are computed with respect thereto as represented at block 160.

The program then analyzes the computed x,y coordinates to determine whether or not they fall within or without the predetermined boundaries described in connection with dashed line 142 in FIG. 3. Accordingly, as represented at block 162, the inquiry is made as to whether the determined coordinates are valid. In the event such coordinates are valid, then as represented at block 164, the coordinate data are outputted, for example, as at line 140 for utilization such as through readouts, storage or transmission. The general program then returns to carry out the sequence of operations again as represented by loop line 166. In the event that the inquiry as represented at block 162 determines that the computed coordinates are unacceptable with respect to their position with respect to boundary 142 they are negated as represented at line 168 returning through line 166 to the commencement of the program.

Turning to FIG. 5B, a subroutine whereby coordinate data are collected as described in conjunction with blocks 152, 154, 156 and 158 is revealed in flow chart form. The subroutine is entered as represented at terminal 180 and proceeds to the instructions represented at block 182 wherein a form of initialization of all of the FET switches is carried out. In this regard, all such switches are caused to assume an "off" status. The program then progresses to an instruction wherein the analog circuitry is reset as represented at block 184. This analog circuitry has been described in conjunction with the precision rectifier or a.c./d.c. converter discussed in conjunction with block 124. Following the resetting of the analog circuitry, as represented at block 186, the program develops an appropriate gating signal represented in conjunction with FIG. 3 at A–D. By electing the appropriate gating signal, the desired banks or series and grounding FET switches are activated. The program then proceeds to the instructions represented at block 188 wherein a delay is carried out to permit the precision rectifier function or converter function 124 to achieve a stable output. The requirement for such delay during a data mode or interval T1–T4 is revealed in conjunction with curve 128 of FIG. 4E. Generally, the delay provides for a sampling of the analog signal output at line 126 at such time as a plateau in the curve 128 has been reached. Following the delay described in conjunction with block 188, as represented at block 190, analog-to-digital conversion as described in conjunction with block 130 in FIG. 3 is commenced. The program then proceeds to the inquiry represented at block 192 wherein a determination as to whether the analog-to-digital conversion is completed. In the event it is not, then as represented at loop line 194, the program dwells until such conversion is completed. Where the inquiry as represented at block 192 is in the affirmative, then the subroutine progresses to the instructions represented at block 196 wherein the converted value is inputted to the microprocessor function for retention and ultimately for computation. Following the inputting of the data, as represented at terminal 198, the subroutine returns to the main program.

Figure 6:
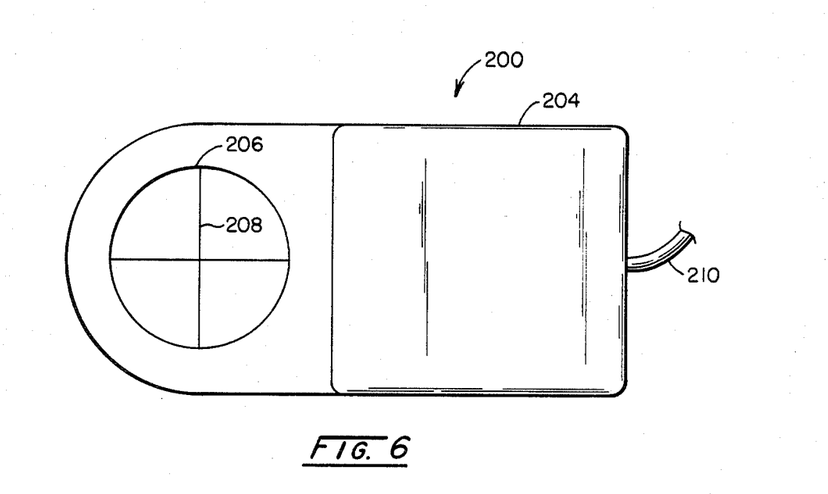
FIG. 6 is a top view of a cross hair cursor component of the invention.
Figure 7:
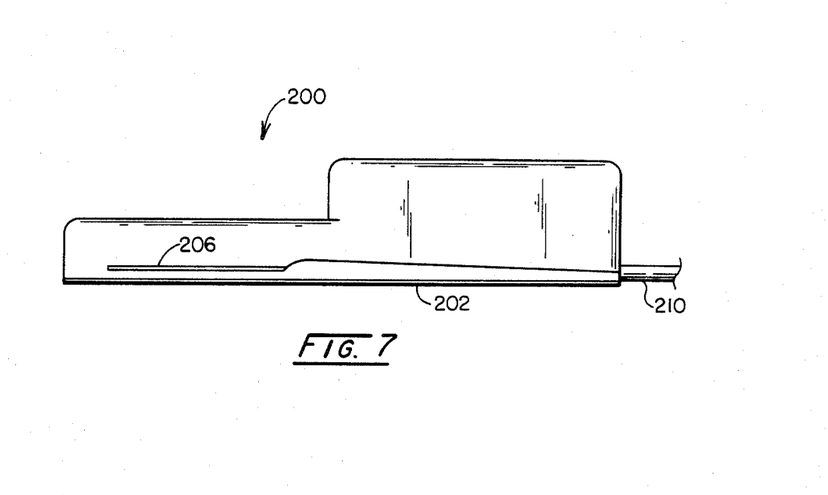
FIG. 7 is a side view of the cross hair cursor of FIG. 6.

The transparency of resistive layer 60 along with the use of an a.c. propagated signal from stylus 22 and the border switching techniques associated with the instant system constitute features which may be combined to achieve a highly effective and desirable hand-held cursor function. Referring to FIGS. 6 and 7, a hand-held cursor is represented generally at 200 as comprising a planar or sheet base member 202 formed, for example, of mylar or the like over one portion of which there is positioned an upstanding body or grip component 204. Over the remaining transparent body portion 202 there is formed a transparent resistive or conductive disk 206. Disk 206 may, for example, be formed of the earlier-described indium tin oxide materials. FIG. 6 reveals that over this circular disk 206 there is positioned or printed very thin orthogonally disposed cross hairs 208. These cross hairs intersect the center of the circle defined by the periphery of disk 206. Disk 206 additionally is coupled to one lead of a shielded cable 210 which may be selectively excited from an a.c. source. Cable 210 will carry the same form of a.c. signal as shielded rod 28 of stylus 22. For example, the disk 206 may be excited at about 200 KHz at 10 volts RMS.

In utilizing the cross hair cursor 200, the operator accurately aligns the cross hairs 208 with the point upon resistive surface desired. The radiative or capacitive coupling achieved by the excitation of disk 206 will cause the development of a position of the centroid of the propagated electromagnetic flux from the disk which will be precisely at the center of the cross hairs or the center of disk 206. Thus high accuracy is achieved without blocking the vision of the operator.

SInce certain changes may be made in the above-described system and apparatus without departing from the scope of the invention herein involved, it is intended that all matter contained in the description thereof or shown in the accompanying drawings shall be interpreted as illustrative and not in a limiting sense.

We claim:

1. An electrographic system comprising:
an electrically insulative substrate;
a resistive layer exhibiting substantially uniform electrical resistance supported upon said insulative substrate and having an operational region extending in a x-coordinate sense between first and second parallel, spaced-apart border regions, and extending in a y-coordinate sense between third and fourth parallel, spaced-apart border regions;
stylus means for generating localized electromagnetic radiation from an a.c. source to effect the propagation thereof toward said resistive layer from positions selectively spaced therefrom to effect interaction therewith;
a plurality of first, discrete, spaced-apart contacts electrically coupled with said resistive layer at said first border region;
a plurality of second, discrete, spaced-apart contacts electrically coupled with said resistive layer at said second border region;
a plurality of third, discrete, spaced-apart contacts electrically coupled with said resistive layer at said third border region;
a plurality of fourth, discrete, spaced-apart contacts electrically coupled with said resistive layer at said fourth border region;
signal treating means having an input of predetermined impedance for selectively receiving electrical signals generated by said stylus means interaction and present at said first and second contacts to derive x-coordinate signals corresponding with the x-coordinate location of said interaction, and selectively responsive to said electrical signals present at said third and fourth contacts to derive y-coordinate signals corresponding with the y-coordinate location of said interaction;
first discrete low impedance solid state series switches, each coupled between a selected one of said first contacts and said signal treating means input and actuable to effect conveyance of said electrical signals thereto;
second discrete low impedance solid state series switches, each coupled between a selected one of said second contacts and said signal treating means input and actuable to effect conveyance of said electrical signals thereto;
third discrete low impedance solid state series switches, each coupled between a selected one of said third contacts and said signal treating means input and actuable to effect conveyance of said electrical signals thereto;
fourth discrete low impedance solid state series switches, each coupled between a selected one of said fourth contact and said signal treating means input and actuable to effect conveyance of said electrical signals thereto;
first discrete low impedance solid state grounding switches, each coupled between a select one of said first contacts and ground and actuable to effect coupling of said select first contact with said ground;
second discrete, low impedance solid state grounding switches, each coupled between a select one of said second contacts and ground and actuable to effect coupling of said select second contact with said ground;
third discrete, low impedance solid state grounding switches, each coupled between a select one of said third contacts and ground and actuable to effect coupling of said select third contact with said ground;
fourth discrete, low impedance solid state grounding switches, each coupled between a select one of said fourth contacts and ground and actuable to effect coupling of said select fourth contact with said ground; and
control means having output means coupled with said first, second, third and fourth series switches and said first, second, third and fourth grounding switches for actuating said first series switches while simultaneously actuating said second grounding switches during a first data mode, for actuating said second series switches while simultaneously actuating said first grounding switches during a second data mode, for actuating said third series switches while simultaneously actuating said fourth grounding switches during a third data mode, and for actuating said fourth series switches while simultaneously actuating said third grounding switches during a fourth data mode.

2. The electrographic system of claim 1 in which said control means effects said first, second, third and fourth data mode switch actuations in a predetermined repetitive sequence.

3. The electrographic system of claim 1 in which said first, second, third, and fourth series switches exhibit an impedance, when actuated, of less than about five ohms.

4. The electrographic system of claim 1 in which said stylus means is a hand manipular, self-contained, battery powered transmitting antenna operative in a frequency range of between about 10 KHz and 1 MHz.

5. The electrographic system of claim 1 in which:
said substrate is substantially transparent; and
said resistive layer is a deposited oxide of metal selected from the group comprising tantalum, indium, tin, antimony and mixtures thereof.

6. The electrographic system of claim 1 in which said signal treating means comprises:
current to voltage converter means having an input of near ground potential for receiving said electrical signals and having an alternating voltage output corresponding therewith; and
converter means for converting said alternating voltage output to a constant voltage output.

7. The electrographic system of claim 6 in which:
said signal treating means includes analog to digital converter means for converting said constant voltage output to digitally characterized signals; and
said control means includes processor means having an input for receiving said digitally characterized signals during each said data mode and responsive to treat said digitally characterized signals to generate digital x-coordinate signals corresponding with the ratio of the difference of said digital characterized signals received during said first and second data modes divided by the sum thereof, said processor means proving said x-coordinate signals at an output thereof.

8. The electrographic system of claim 7 in which said processor means is responsive to treat said digitally characterized signals to generate y-coordinate signals corresponding with the ratio of the difference of said digitally characterized signals received during said third and fourt data modes divided by the sum thereof, said processor means providing said y-coordinate signals at said output.

9. The electrographic system of claim 8 in which:
said resistive layer has a predetermined operational border extending adjacent said first, second, third and fourth border regions; and
said processor means is responsive to said x-coordinate signals and said y-coordinate signals having values representing positions of said stylus means outwardly of said border to effect the negation thereof.

10. The electrographic system of claim 1 in which said first, second, third and fourth spaced-apart contacts are elongate conductive pads of predetermined length mutually spaced-apart by about said predetermined length.

11. The electrographic system of claim 1 in which:
said control means effects said first, second, third and fourth data mode switch actuations in a predetermined repetitive sequence; and
said first, second, third, and fourth series switches exhibit an impedance, when actuated, of less than about five ohms.

12. An electrographic system comprising:
an electrically insulative substrate;
a resistive layer exhibiting substantially uniform electrical resistance supported upon said insulative substrate and having an operational region extending in a x-coordinate sense between first and second parallel, spaced-apart border regions, and extending in a y-coordinate sense between third and fourth parallel, spaced-apart border regions;
cursor means including an electrically conductive transparent disk having a cross hair indicia formed thereon positionable adjacent said resistive layer;
means for exciting said cursor means from an a.c. source to generate localized electromagnetic radiation from said disk to effect an interaction with said resistive layer;
a plurality of first, discrete, spaced-apart contacts electrically coupled with said resistive layer at said first border region;
a plurality of second, discrete, spaced-apart contacts electrically coupled with said resistive layer at said second border region;
a plurality of third, discrete, spaced-apart contacts electrically coupled with said resistive layer at said third border region;
a plurality of fourth, discrete, spaced-apart contacts electrically coupled with said resistive layer at said fourth border region;
signal treating means having an input for selectively receiving electrical signals generated by said cursor means interaction and present at said first and second contacts to derive output signals corresponding therewith, and selectively receiving said electrical signals present at said third and fourth contacts to derive output signals corresponding therewith;
solid state switching means for coupling said first contacts in signal transferring relationship with said signal treating means input while effecting a mutual, open circuit isolation of said third and fourth contacts, for coupling said second contacts in signal transferring relationship with said signal treating means input while effecting a mutual, open circuit isolation of said third and fourth contacts, for coupling said third contacts in signal transferring relationship with said signal treating means input while effecting a mutual, open circuit isolation of said first and second contacts, and for coupling said fourth contacts in signal transferring relationship with said signal treating means input while effecting a mutual, open circuit isolation of said first and second contacts; and
control means responsive to said output signals for deriving x-coordinate signals corresponding with the x-coordinate location of said interaction and y-coordinate signals corresponding with the y-coordinate location of said interaction.

13. The system of claim 12 in which said signal treating means comprises:
current to voltage converter means having an input of predetermined impedance for receiving said electrical signals and having an alternating voltage output corresponding therewith;

converter means for converting said alternating voltage; and means for converting said output signals to corresponding digital form.

14. The system of claim 13 in which said control means is responsive to said signals in digital form corresponding with each said first and second border regions for deriving said x-coordinate signals corresponding with the ratio of the difference of said output signals divided by the sum thereof.

15. The system of claim 13 in which said control means is responsive to said output signals in digital form correspnding with each said third and fourth border regions for deriving said y-coordinate signals corresponding with the ratio of the difference of said output signals divided by the sum thereof.

16. The electrographic system of claim 12 in which:
said resistive layer has a predetermined operational border extending adjacent said first, second, third and fourth border regions; and said processor means is responsive to said x-coordinate signals and said y-coordinate signals having values representing positions of said stylus means outwardly of said border to effect the negation thereof.

* * * * *